(12) United States Patent
Suzuki (10) Patent No.: US 6,286,101 B1
(45) Date of Patent: Sep. 4, 2001

(54) CENTRAL PROCESSING UNIT AND MICROCOMPUTER SYSTEM HAVING AN INTERNAL OPERATION UNIT FOR CRYPTOGRAPHIC

(75) Inventor: Hiroaki Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/005,009

(22) Filed: Jan. 9, 1998

(30) Foreign Application Priority Data

Sep. 5, 1997 (JP) .................................................. 9-241501

(51) Int. Cl.[7] .............................. G06F 13/00; H04L 9/30; H04N 7/167
(52) U.S. Cl. ........................... 713/200; 713/200; 380/28; 380/237
(58) Field of Search ................................ 326/39; 380/30, 380/237, 28; 369/47; 708/490, 409; 712/43, 23, 211, 224; 713/200

(56) References Cited

U.S. PATENT DOCUMENTS

| 4,323,964 | * | 4/1982 | Gruner | 712/211 |
|---|---|---|---|---|
| 5,070,492 | * | 12/1991 | Ogawa et al. | 369/47 |
| 5,301,231 | | 4/1994 | Abraham et al. | . |
| 5,541,529 | * | 7/1996 | Mashiko et al. | 326/39 |
| 5,848,159 | * | 12/1998 | Collins et al. | 380/30 |
| 5,872,994 | * | 2/1999 | Akiyama et al. | 712/43 |
| 5,892,696 | * | 4/1999 | Kozu | 708/490 |
| 5,951,670 | * | 9/1999 | Glew et al. | 712/23 |
| 6,038,667 | * | 3/2000 | Helbig, Sr. | 713/200 |

* cited by examiner

Primary Examiner—Daniel H. Pan
Assistant Examiner—Te Yu Chen
(74) Attorney, Agent, or Firm—Burns, Doane, Swecker & Mathis, LLP (57) ABSTRACT

A central processing unit capable of solving a problem of a conventional one in that when a user tries to implement a cryptographic function unique to the user using the conventional central processing unit, it is necessary to connect an external operation unit through a bus, and this imposes a heavy development load on the user. The present central processing unit has, in an operation block performing operations based on a register file which operational instructions can directly refer to, an operation unit having a facility which provides the user with capability of setting its operational function.

19 Claims, 11 Drawing Sheets

| (Reg0[i],Reg1[i],Reg2[i],Reg3[i]) | LOGIC OPERATIONS(A=Src0[i],B=Src[i]) |
|---|---|
| 0 0 0 0 | A |
| 0 0 0 1 | $\overline{A}$ |
| 0 0 1 0 | $A \cdot B$, $\overline{(\overline{A}) + (\overline{B})}$ |
| 0 0 1 1 | $\overline{(A \cdot B)}$, $(\overline{A}) + (\overline{B})$ |
| 0 1 0 0 | $A+B$, $\overline{(\overline{A}) \cdot (\overline{B})}$ |
| 0 1 0 1 | $\overline{(A+B)}$, $(\overline{A}) \cdot (\overline{B})$ |
| 0 1 1 0 | $A \oplus B$, $(\overline{A}) \oplus (\overline{B})$ |
| 0 1 1 1 | $\overline{(A \oplus B)}$, $\overline{(\overline{A}) \oplus (\overline{B})}$ |
| 1 0 0 0 | $\overline{A}$ |
| 1 0 0 1 | $A$ |
| 1 0 1 0 | $(\overline{A}) \cdot B$, $\overline{(A + (\overline{B}))}$ |
| 1 0 1 1 | $\overline{((\overline{A}) \cdot B)}$, $A + (\overline{B})$ |
| 1 1 0 0 | $(\overline{A}) + B$, $\overline{(A \cdot (\overline{B}))}$ |
| 1 1 0 1 | $\overline{((\overline{A}) + B)}$, $A \cdot (\overline{B})$ |
| 1 1 1 0 | $\overline{(A \oplus B)}$, $(\overline{A}) \oplus B$, $A \oplus (\overline{B})$ |
| 1 1 1 1 | $A \oplus B$, $\overline{((\overline{A}) \oplus B)}$, $\overline{(A \oplus (\overline{B}))}$ |

FIG.12
(PRIOR ART)

CENTRAL PROCESSING UNIT AND MICROCOMPUTER SYSTEM HAVING AN INTERNAL OPERATION UNIT FOR CRYPTOGRAPHIC

BACKGROUND OF THE INVENTION

1. Field of the Invention

The present invention relates to a central processing unit and microcomputer system preferably applied to cryptography, and particularly to an improved central processing unit and microcomputer capable of easily implementing an extended operational function other than predetermined ones in the central processing unit.

2. Description of Related Art

Figure 12:
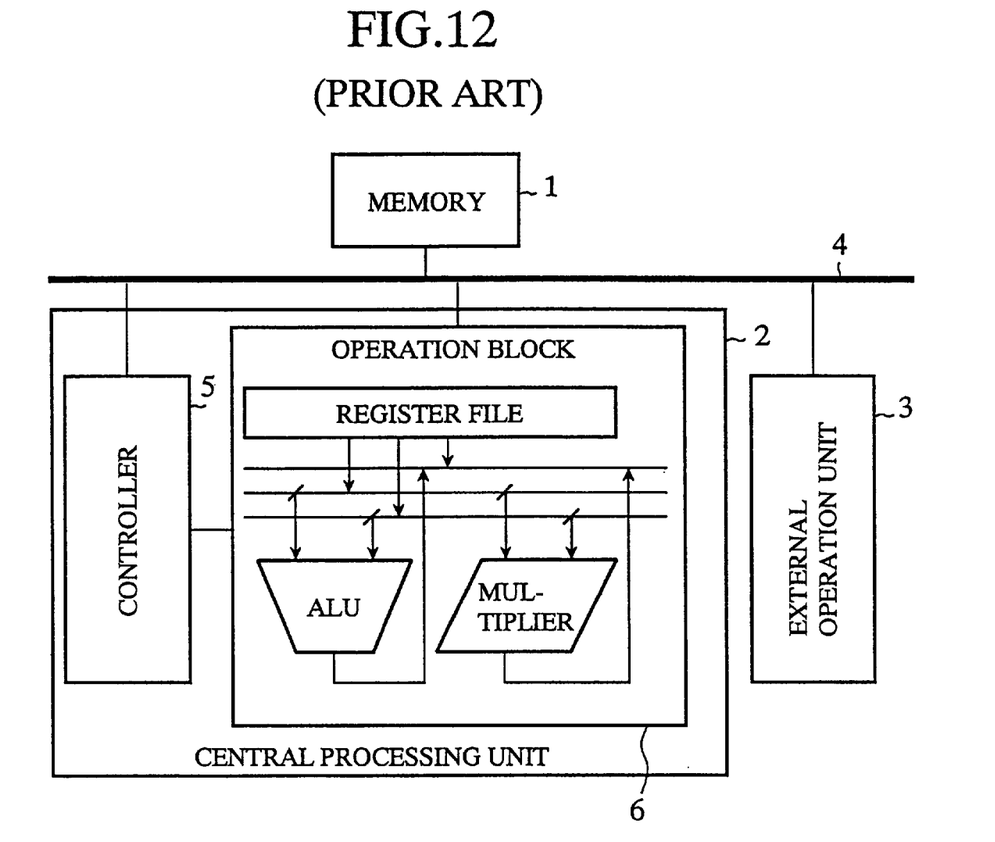
FIG. 12 is a block diagram showing a configuration of a conventional microcomputer system with a cryptographic function.

FIG. 12 is a block diagram showing a configuration of a conventional microcomputer system. In FIG. 12, the reference numeral 1 designates a memory for storing programs a central processing unit (CPU) executes, 2 designates the CPU executing instructions of the programs step by step, 3 designates an external operation unit including a plurality of logic circuits interconnected in accordance with a setting of a user, and 4 designates an external bus line interconnecting the three components 1–3 to exchange information.

The reference numeral 5 designates a controller for decoding the instructions and for controlling the operation of the microcomputer system in its entirety, and 6 designates an operation block which includes a register file the operational instructions can directly refer to, and carries out predetermined operations based on two input data including input data set in the register file. Thus, the central processing unit is constructed.

Here, the term "register file the operational instructions can directly refer to" refers to a register file that can be used in such a manner that in "ADD A, B, C" operation, for example, in which data A and B is added and its result is stored in C, an address in the register file is described as A, and its content can used as the actual data of the addition.

Next, the operation of the conventional system will be described.

First, the controller 5 of the central processing unit 2 reads an instruction from the memory 1, decodes the instruction, and carries out control in accordance with it.

For example, when the instruction is an add operation of two data in the operation block 6, and stores its result in the register file in the operation block 6, the controller 5 supplies the operation block 6 with data through the external bus line 4, and outputs a control signal to store the resultant sum in the register file. Thus, the operation block 6 adds to the data set in the register file the data supplied through the external bus line 4, and stores the sum in the register file.

Likewise, when having the external operation unit 3 execute data processing, the controller 5 supplies the external operation unit 3 with data and a control signal to execute the operation through the external bus line 4. The external operation unit 3, in response to this, carries out operation between the supplied data and data preset therein.

The controller 5 continues to perform such control based on the instructions of the program step by step, so that the microcomputer achieves the intended operation.

With such a configuration, the conventional microcomputer must use the external operation unit 3 when it carries out an extended operation other than operations predefined by the CPU, which results in some problems which will be described below.

Incidentally, a common conventional CPU is only provided with logic operations such as logical OR or logical AND over the entire bits of data, or arithmetic operations such as addition or subtraction over the entire bits of data. Even higher rank CPUs include only such operations as multiplication or division between two data at most.

Next, the problems involved in the conventional microcomputer system will be described.

To provide the external operation unit 3, a system designer, after completing the logic design of the operational functions to be implemented by the external operation unit 3, selects optimal gate arrays or field programmable gate arrays, and makes an electric, physical design such as bus connection between the external operation unit 3 and the central processing unit 2. Thus, providing the conventional microcomputer system with an extended operation results in an increase in development load of a user, prolongation of a development time, and an increase in development cost due to increase in the number of components and to development of a logic unit specific to the system.

Furthermore, even if the extended operation can be implemented at the cost of these factors, a problem arises in that it can prolong the cycle time and hence would degrade the performance of the system. This is because it is necessary for the CPU to consider, in addition to the instruction cycle of the operation, a read cycle to fetch the operation result held by the external operation unit 3 in order to have the external operation unit 3 carry out the operation and to use that result, which will require an overhead time.

On the other hand, to implement a flexible system design by way of software using common instructions, a microcomputer operating at a higher clock frequency is required. This will demand higher cost components and increase in power consumption.

In particular, it is necessary for a microcomputer system requiring cryptographic protection to execute part of the operation involved in cryptography with the external operation unit 3. This is because the cryptograph encrypted entirely using software can be rather easily decrypted, and hence has a problem in confidentiality. As a result, it has become essential to develop the external operation unit 3, which causes problems such as prolongation of development time and an increase in the development cost.

SUMMARY OF THE INVENTION

The present invention is implemented to solve the foregoing problems. It is therefore an object of the present invention to provide a central processing unit and a microcomputer which can easily implement extended functions such as cryptographic operation without any additional hardware like an auxiliary operation unit.

Another object of the present invention is to provide a microcomputer system which is easily developed and can implement highly confidential cryptographic protection.

According to a first aspect of the present invention, there is provided a central processing unit comprising: an operation block including a register file an operational instruction can directly refer to, the operation block performing an operation on two or more input data including data set in the register file; a controller for setting, to the operation block, predetermined data in response to the operational instruction, and for carrying out control with reference to an operation result of the operation block; and an operation unit, included in the operation block, for achieving a set operation, the operation unit having a facility which provides users with capability of setting the operation of the operation unit.

Here, the operation block may comprise only the operation unit as an operational facility.

The operation unit may comprise a logic circuit for performing a plurality of operations on the input data, and an extended operational function setting register for selecting one of the plurality of operations of the logic circuit.

The logic circuit may comprise a plurality of logic segments, and may change connection of the logic segments in accordance with a setting of the extended operational function setting register.

The extended operational function setting register may be a write only register which prevents its data from being read.

The operation unit may comprise a logic circuit for performing a predetermined logic operation, and an internal connection switching circuit, interposed between a data input terminal of the operation unit and an input terminal of the logic circuit, for switching interconnection between the two input terminals.

The central processing unit may further comprise an extended set function eliminating circuit for eliminating contents of the extended operational function setting register when the controller does not supply, within a predetermined interval, the extended operational function setting register with a set continue signal that instructs continuation of the contents.

According to a second aspect of the present invention, there is provide a microcomputer system comprising: an operation block including a register file an operational instruction can directly refer to, the operation block performing an operation on two or more input data including data set in the register file; a controller for setting, to the operation block, predetermined data in response to the operational instruction, and for carrying out control with reference to an operation result of the operation block; and an operation unit, included in the operation block, for achieving a set operation, the operation unit having a facility which provides users with capability of setting the operation of the operation unit, wherein the operation unit is used for a cryptographic processing of information.

Here, the operation block may comprise only the operation unit as an operational facility.

DETAILED DESCRIPTION OF THE PREFERRED EMBODIMENTS

The invention will now be described with reference to the accompanying drawings.

Embodiment 1

Figure 1:
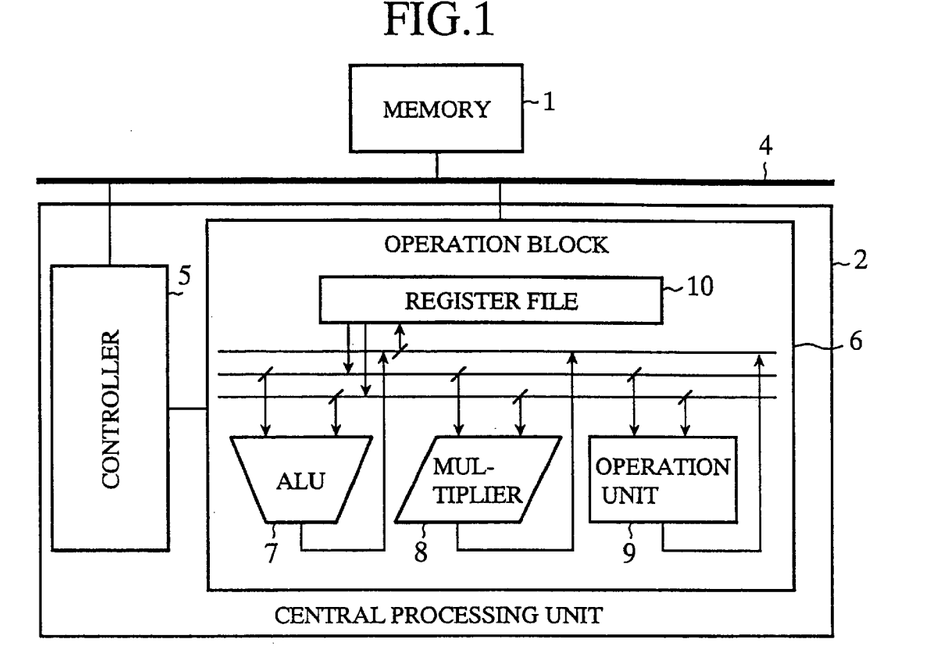
FIG. 1 is a block diagram showing a configuration of an embodiment 1 of a microcomputer system with a cryptographic function in accordance with the present invention.

FIG. 1 is a block diagram showing a configuration of an embodiment 1 of a microcomputer system with a cryptographic function in accordance with the present invention. In FIG. 12, the reference numeral 1 designates a memory for storing programs and the like, 2 designates a central processing unit (CPU) executing instructions of the programs step by step, and 4 designates an external bus line interconnecting the memory 1 and central processing unit 2 to transmit information.

The central processing unit 2 comprises a controller 5 for decoding the instructions of the programs and for controlling the overall operation of the microcomputer system, a register file 10 the operational instructions can directly refer to, and an operation block 6 carrying out predetermined operations based on two input data including input data set in the register file 10. The controller 5 supplies the operation block 6 with a control signal to control the operation output. The operation block 6 is generally called a data path.

The reference numeral 7 designates an arithmetic and logic unit (ALU) for carrying out logic operations such as logical OR (NOR), AND (NAND) between the entire bits of two data, and arithmetic operations such as addition and subtraction. The reference numeral 8 designates a multiplier (MPY) specifically provided for multiplication, and 9 designates an operation unit to which user defined operation functions can be set. These operation units 7, 8 and 9 can perform parallel, independent operations based on two input data, and one of the operation results selected in response to the control signal is output onto the external bus line 4.

Next, the operation of the present embodiment 1 will be described.

First, an execution will be described of an add operation "ADD A, B, C", in which the data stored in addresses A and B of the register file 10 are added, and the resultant sum is stored in address C of the register file 10.

The controller 5 in the central processing unit 2 reads an instruction from the memory 1, and decodes it. As the result of decoding, the controller 5 sets the addresses A and B to the register file 10, has it output their contents, and commands the operation block 6 to execute the add operation by the control signal.

Subsequently, the operation block 6 executes operations preset in the logic, arithmetic and operation units on the basis of the two data output from the register file 10, and selects from among them the resultant sum to store it in the address C of the register file 10. The address C is set by the controller 5 in synchronism with the end of the addition.

The type of the instruction determines which of the three operational units 7, 8 and 9 is to be employed, and in the case of the add operation, the ALU 7 is used. On the other hand, when executing an operation to encrypt information, an instruction using the operation unit 9 is issued. The contents of processing of the operation unit 9 is designed by a system designer. Unlike the add operation, the contents of the processing of the operation unit 9 can be kept in camera, and at the same time can be changed flexibly, thereby making it possible to increase the confidentiality.

In this way, the microcomputer system executes the program stored in the memory 1 by carrying out its instructions step by step, thus achieving the intended processing.

According to the embodiment 1, the operation block 6, including the register file 10 the instructions can directly refer to, comprises in addition to the fundamental operation units the operation unit 9 in which a user can set a desired operational function. This has an advantage of readily improving the confidentiality of the cryptographic processing specific to a user without making a design of any additional hardware for carrying out the specific processing, and without degrading the fundamental performance such as speed and functions of ordinary processings.

Furthermore, since no hardware other than the central processing unit 2 is needed for executing operations, it is not necessary to make an electric or physical design to interconnect hardware through the bus. This has an advantage of shortening the development time and reducing the cost of the system.

Moreover, since the operation unit 9 provided in the central processing unit 2 enables the user to implement the cryptography specific to the user, it becomes very difficult to identify the relationships between the cryptogram and the information even if the program is decoded. As a result, a high confidentiality can be achieved not inferior to that implemented by carrying out part or all of the encryption with the external operation unit as in the conventional system. At the same time, since the time required for encryption nearly matches the time required by the other units in the CPU 2, that is, the ALU 7 and multiplier 8, it is much reduced as compared with that of the conventional system. In particular, encryption including iteration of a number of operations can be completed in a much shorter time period.

Embodiment 2

Figure 2:
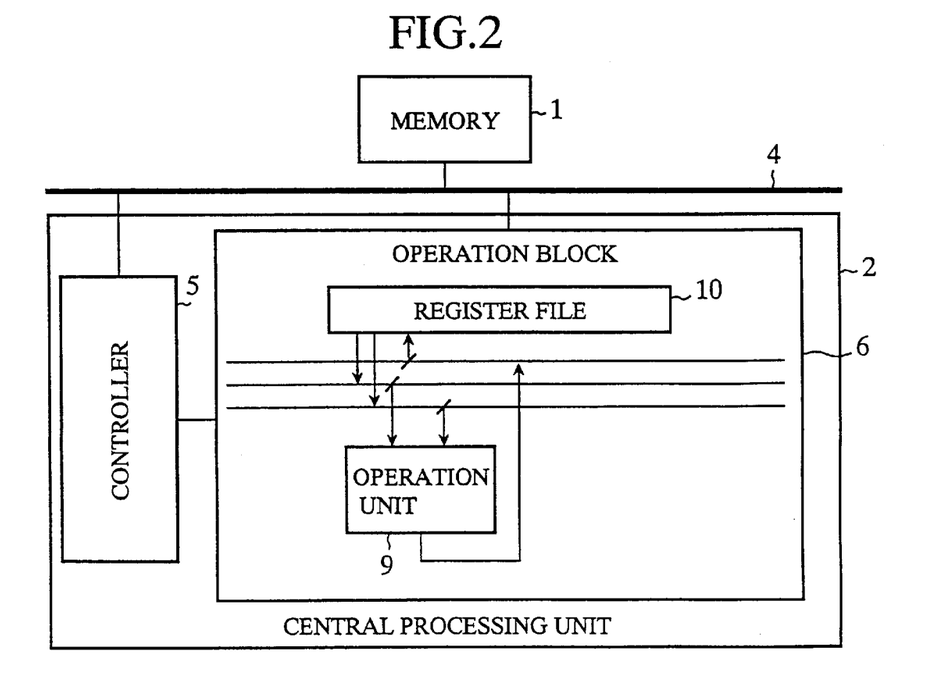
FIG. 2 is a block diagram showing a configuration of an embodiment 2 of a microcomputer system with a cryptographic function in accordance with the present invention.

FIG. 2 is a block diagram showing a configuration of an embodiment 2 of a microcomputer system with a cryptographic function in accordance with the present invention. As shown in FIG. 2, the present embodiment 2 differs from the embodiment 1 in that FIG. 2 has an operation block 6 which includes, as operation portions, only the operation unit 9 with the ALU 7 and multiplier 8 removed. Since the remaining configuration is the same as that of the embodiment 1, its corresponding portions are designated by the same reference numerals and the description thereof is omitted here.

Next, the operation of the present embodiment 2 will be described.

When executing the add operation "ADD A, B, C" described in the embodiment 1, the add operation is preset in the operation unit 9 as its operation so that two data are added. In this case, the program does not describe the add instruction, but an instruction to use the operation unit 9. Thus, the addition is carried out in accordance with a combination of the instruction and the content preset in the operation unit 9. If subtraction is preset in the operation unit 9 instead of addition, the subtraction is executed, even if the same instruction is output from of the program. The controller 5 of the central processing unit 2 reads the instruction from the memory 1, and decodes it. As the result of decoding, the controller 5 sets the addresses A and B to the register file 10, has it output their contents, and commands the operation unit 9 to execute the preset operation by the control signal. Thus, the operation block 6 executes addition in accordance with the preset operation, and the resultant sum is stored in the address C of the register file 10. The address C is set by the controller 5 in synchronism with the end of the addition.

Thus, when performing the operation by such an operation unit, the contents of the processing vary in accordance with the contents preset in the operation unit 9, even if the same instructions are described in the program stored in the memory 1. In this case, the contents of the processing includes unique operations preset by the user besides the common operations like addition.

In this way, the microcomputer system executes the program stored in the memory 1 by carrying out its instructions step by step, thus achieving the intended processing.

According to the embodiment 2, the operation block 6, which includes the register file 10 the instructions can directly refer to, comprises the operation unit 9 to which a user can set a desired operational function. This has an advantage of readily improving the confidentiality of the cryptographic processing specific to individual users without making a design of any additional hardware for carrying out the specific processing.

Furthermore, since no hardware other than the central processing unit 2 is needed for executing operations, it is not necessary to make an electric or physical design to interconnect hardware through the bus. This has an advantage of shortening the development time and reducing the cost of the system.

Moreover, since the operation unit 9 provided in the operation block 6 enables a user to implement the cryptography specific to the user, it becomes very difficult to identify the relationships between the cryptogram and the information even if the program is decoded. As a result, a high confidentiality can be achieved not inferior to that implemented by carrying out part or all of the encryption with the external operation unit as in the conventional system. At the same time, since the time required for encryption nearly matches the time required by the CPU 2 to execute normal operational functions, it is much reduced as compared with that of the conventional system. In particular, encryption including iteration of a number of operations can be completed in a much shorter time period.

Embodiment 3

Figure 3:
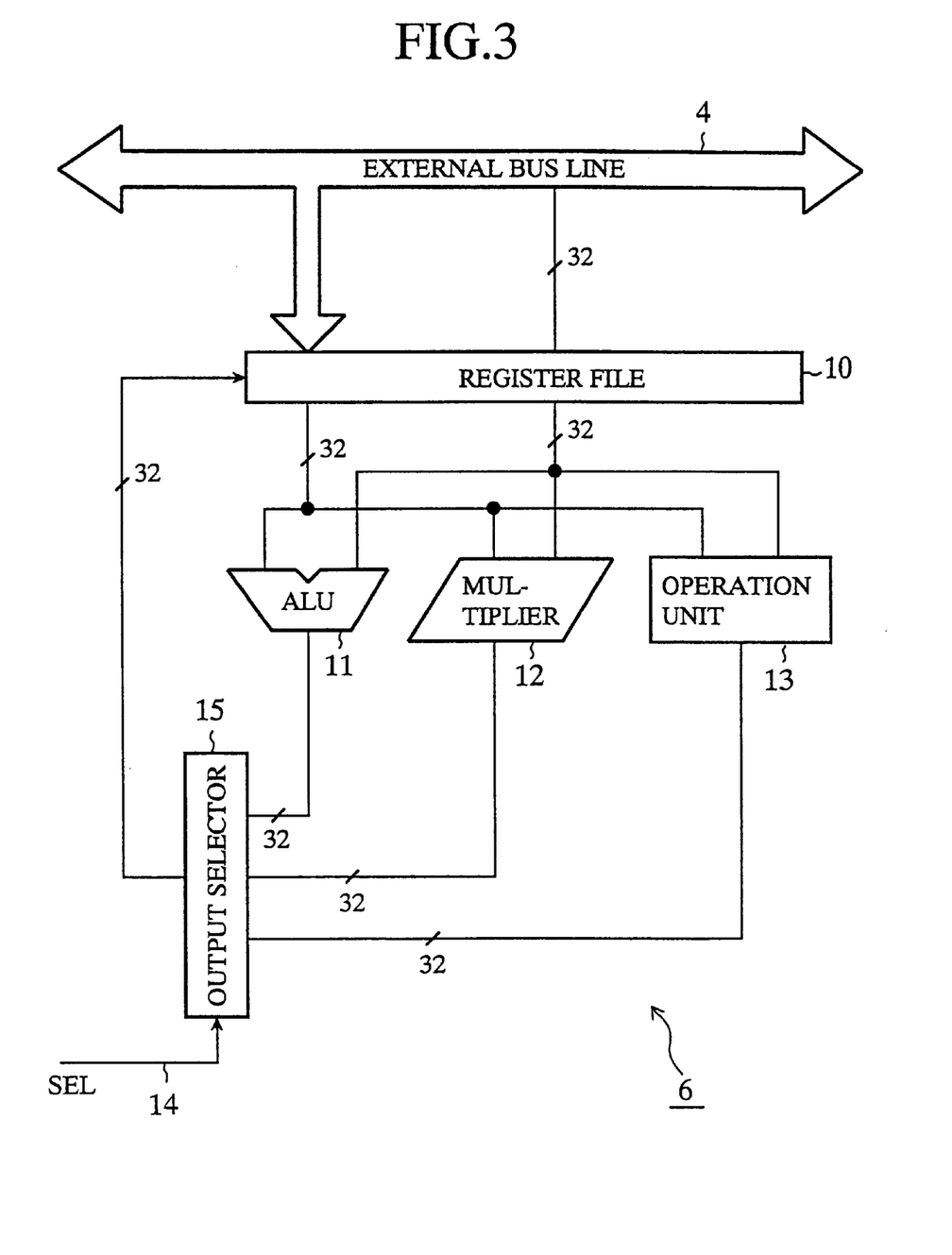
FIG. 3 is a block diagram showing a configuration of an operation block and its periphery of an embodiment 3 in accordance with the present invention.

FIG. 3 is a block diagram showing a configuration of the operation block 6 and its peripherals of an embodiment 3 in accordance with the present invention. In FIG. 3, the reference numeral 10 designates a register file which stores a plurality of 32-bit data, and to which an instruction can directly refer by addressing. The reference numeral 11 designates an arithmetic and logic unit that performs one of addition, subtraction, and logic operations between two 32-bit data stored in the register file 10 over their entire bits, and outputs the arithmetic and logic results. The reference numeral 12 designates a multiplier dedicated to multiplying two 32-bit data over their entire bits and outputs the multiplication result, and 13 designates an operation unit for performing an operation specified by a user and outputs the specific operation result. The reference numeral 15 designates an output selector for selecting in response to an operation select signal 14 one of the 32-bit data from among the arithmetic and logic result, multiplication result and specific operation result, and stores the selected one in the register file 10.

Figure 4:
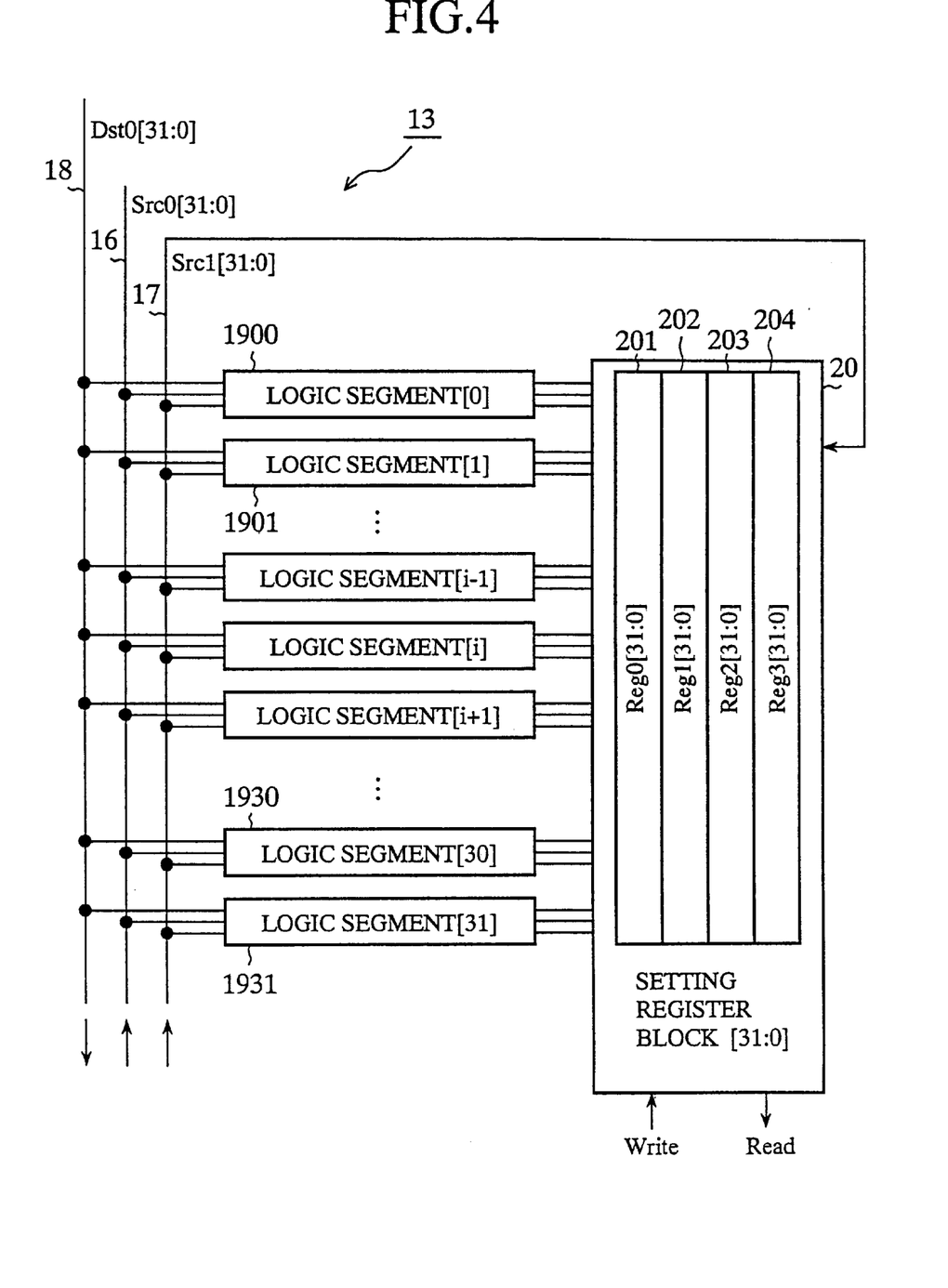
FIG. 4 is a block diagram showing a configuration of an operation unit of the embodiment 3.

FIG. 4 is a block diagram showing a configuration of the operation unit 13. In FIG. 4, the reference numeral 16 designates a first 32-bit input data line connected to the register file 10 (shown in FIG. 3), 17 designates a second 32-bit input data line connected to the register file 10; and 18 designates a 32-bit output data line for supplying the output selector 15 (shown in FIG. 3) with the specific operation result. The reference numerals 1900–1931 each designate one of 32 logic segments, each of which is supplied with each pair of bits of the two input data, and outputs its bit operation result as a 1-bit output data to the output selector 15. The reference numerals 201–204 each designate a setting register (extended operational function setting register) that performs read/write of the second 32-bit input data on the second input data line 17 in response to the read/write signal generated on the basis of the control signal. The reference numeral 20 designates a setting register block (i.e., store circuit) comprising the four setting registers 201–204, and supplies the respective logic segment 19xx with a 4-bit operation select signal in accordance with the setting of the four setting registers 201–204 to control the operation result output from the logic segments 19xx.

Figure 5:
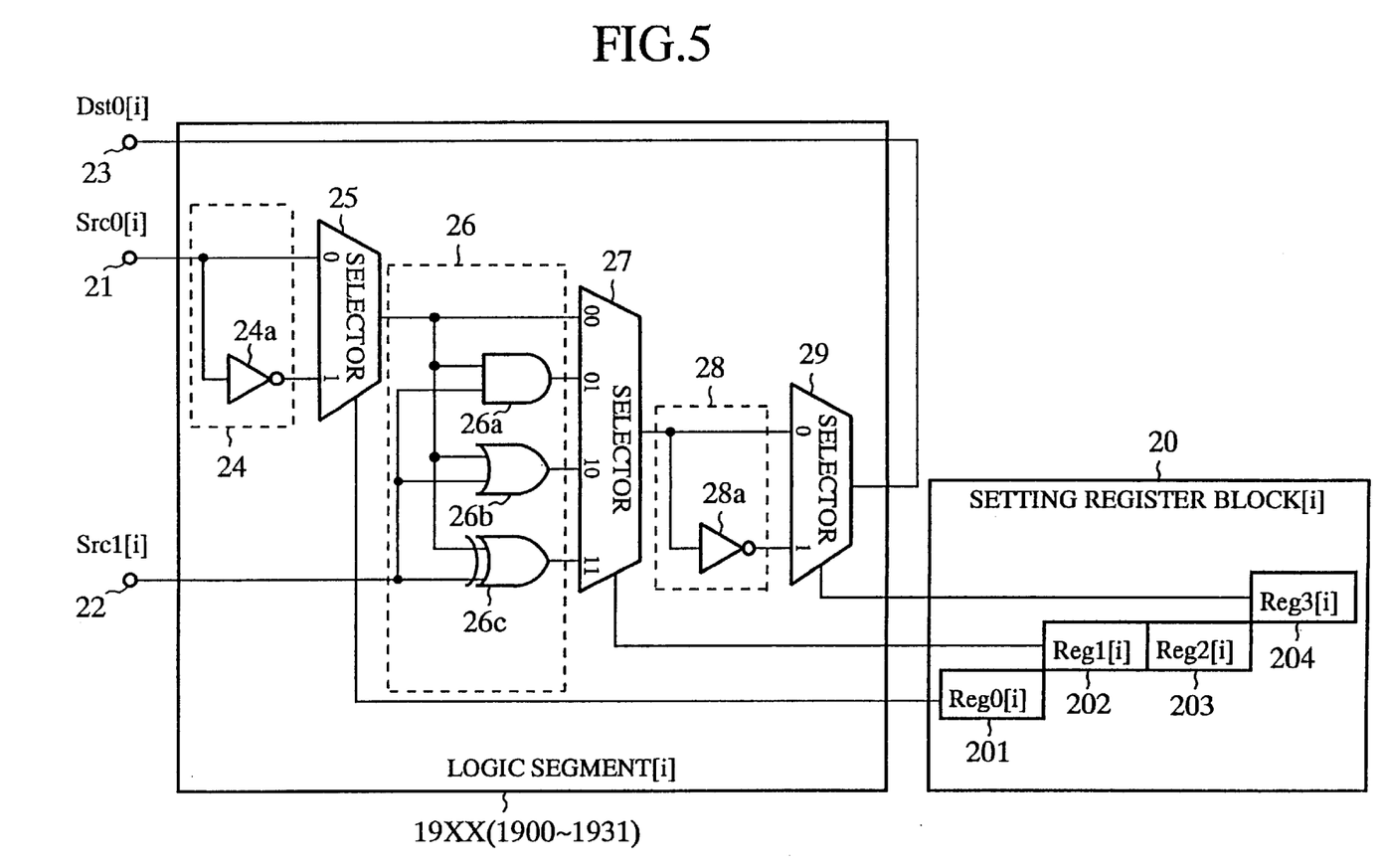
FIG. 5 is a block diagram showing a configuration of a major portion of the operation unit of the embodiment 3.

FIG. 5 is a detailed block diagram showing the logic segment 19xx and its periphery. The logic segment 19xx inputs i-th pair of bits of the two input data, and outputs the operation result between the two bits as the i-th bit data of the output data. In FIG. 5, the reference numeral 21 designates a first input terminal to which the i-th bit data of the first input data is supplied, 22 designates a second input terminal to which the i-th bit data of the second input data is supplied, and 23 designates an output terminal from which the i-th bit data of the output data is produced. The reference numeral 24 designates a first logic circuit that includes an inverter 24a, and outputs the bit data supplied to the first input terminal 21 and its inverted bit data. The reference numeral 25 designates a first selector for selecting one of the two data bits supplied from the first logic circuit 24 in accordance with the set state of the i-th bit of the setting register 201. The reference numeral 26 designates a second logic circuit which includes a two-input AND gate 26a, a two input OR gate 26b and a two-input EX-OR (exclusive-OR) gate 26c, and which outputs a logical AND bit data between the bit data output from the first selector 25 and the bit data supplied to the second input terminal 22, the logical OR bit data of the two bit data, and the logical EX-OR bit data thereof. The reference numeral 27 designates a second selector for selecting one of the four bit data supplied thereto from the second logic circuit 26 in response to the set state of the i-th bits of the second and third setting registers 202 and 203. The reference numeral 28 designate a third logic circuit which includes an inverter 28a, and outputs the data bit output from the second selector 27 and its inverted data bit. The reference numeral 29 designates a third selector for selecting one of the two data bits supplied from the third logic circuit 28 in response to the set state of the i-th bit of the fourth setting register 204. The third selector 29 supplies the output terminal 23 with the bit data to be output from the logic segment 19xx.

Next, the operation of the present embodiment 3 will be described.

Since the operation of the controller 5, in which it reads instructions from the memory 1 and controls the respective portions, is similar to that of the embodiment 1, its description will be omitted here, and the operation of the operation block 6 in response to the control will be described.

Receiving the control signal from the controller 5, the operation block 6 executes in parallel the plurality of operations based on the two data stored in the register file 10 in the ALU 11, multiplier 12 and operation unit 13, and supplies the output selector 15 with the plurality of operation results. For example, the ALU 11 performs addition, the multiplier 12 carries out multiplication, and the operation unit 13 performs an intended operation. The selector 15 selects in response to the operation select signal 14 one of the operation results from among them, and overwrites it on the register file 10. Thus, the operation block 6 executes the intended operation.

Next, the operation of the operation unit 13 will be described in detail.

Figure 11:
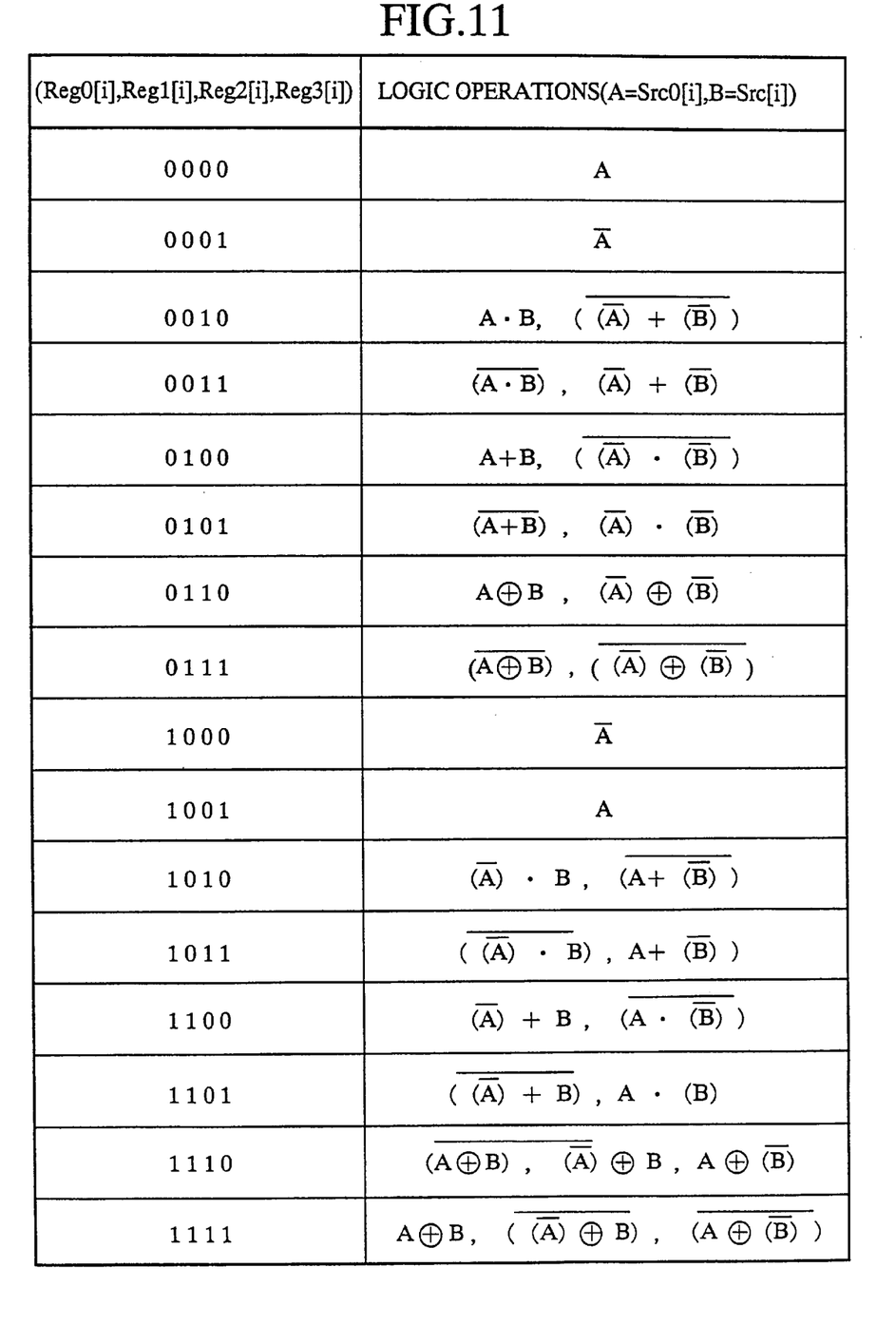
FIG. 11 is a table showing relationships between instruction codes and logic operations.

To implement the operation by the operation unit 13, the controller 5 first supplies the setting register block 20 with the write signal, and at the same time sets the contents of the individual setting registers 201–204 by carrying out writing of them through the external bus line 4. To read the contents of these setting registers, it is enough to supply the setting register block 20 with the read signal. Once the setting of the four setting registers 201–204 has been completed, the operations of the logic segments 1900–1931 are determined in accordance with the setting of the registers. When the relationships between the bit data of the setting registers 201–204 and the selecting operations of the selectors 25, 27 and 29 are arranged as shown in FIG. 5, the relationships between the set states of the four setting registers and the operations of the logic segments are determined as shown in FIG. 11. As is clearly seen from FIG. 11, the configuration as shown in FIG. 5 can achieve all the operations of THRU, NOT, AND, OR, and EX-OR, and their counterparts in which their inputs and/or outputs are inverted.

Once the setting of the four setting registers 201–204 has been completed based on the relationships as shown in FIG. 11, the operation unit 13 performs the operation, and stores the result in the register file 10. The operation at this step is the same as the general operation described above except that the output selector 15 selects in response to the operation select signal 14 the output data of the operation unit 13, that is, the specific operation result. Thus, the description thereof is omitted here.

Incidentally, it is not necessary for the operations to always follow the setting of the setting registers 201–204. For example, when the operations continue under the same setting, a new setting is not needed. Only, it is required that the setting must be completed before the operations.

As described above, since the present embodiment 3 comprises the setting registers 201–204 in the operation unit 13, it can achieve the same effect and advantage as the embodiment 1. In addition, it can switch the operation to entirely different one by changing setting of at least one of the four setting registers 201–204 during the execution of a program or the like. This enables the operation to be switched at once by changing the contents of the setting registers 201–204 during the running of the program. This will make it almost impossible to analyze the program by tracing, and hence further improves the confidentiality of the cryptographic processing.

In addition, the present embodiment 3 can achieve different operations on a bit by bit basis because it comprises the logic segments 1900–1931 for respective bits and the setting registers 201–204 consisting of the same number of bits-as the number of logic segments. As a result, complicated encryption which would be time consuming in the conventional system can be carried out easily at a high speed. Furthermore, since the present embodiment 3 can handle, in parallel, operations between 8-bit data or 16-bit data, or between a plurality of data requiring different operations, it can increase the data processing speed and its efficiency.

Moreover, since the present embodiment 3 includes in a logic segment a number of logic circuits whose logic connection can be changed in accordance with the setting of the setting registers 201–204, more complicated operational functions can be achieved as compared with a configuration comprising a number of simple logic circuits arranged in parallel. This makes it possible to further improve the confidentiality of the cryptographic processing.

Embodiment 4

Figure 6:
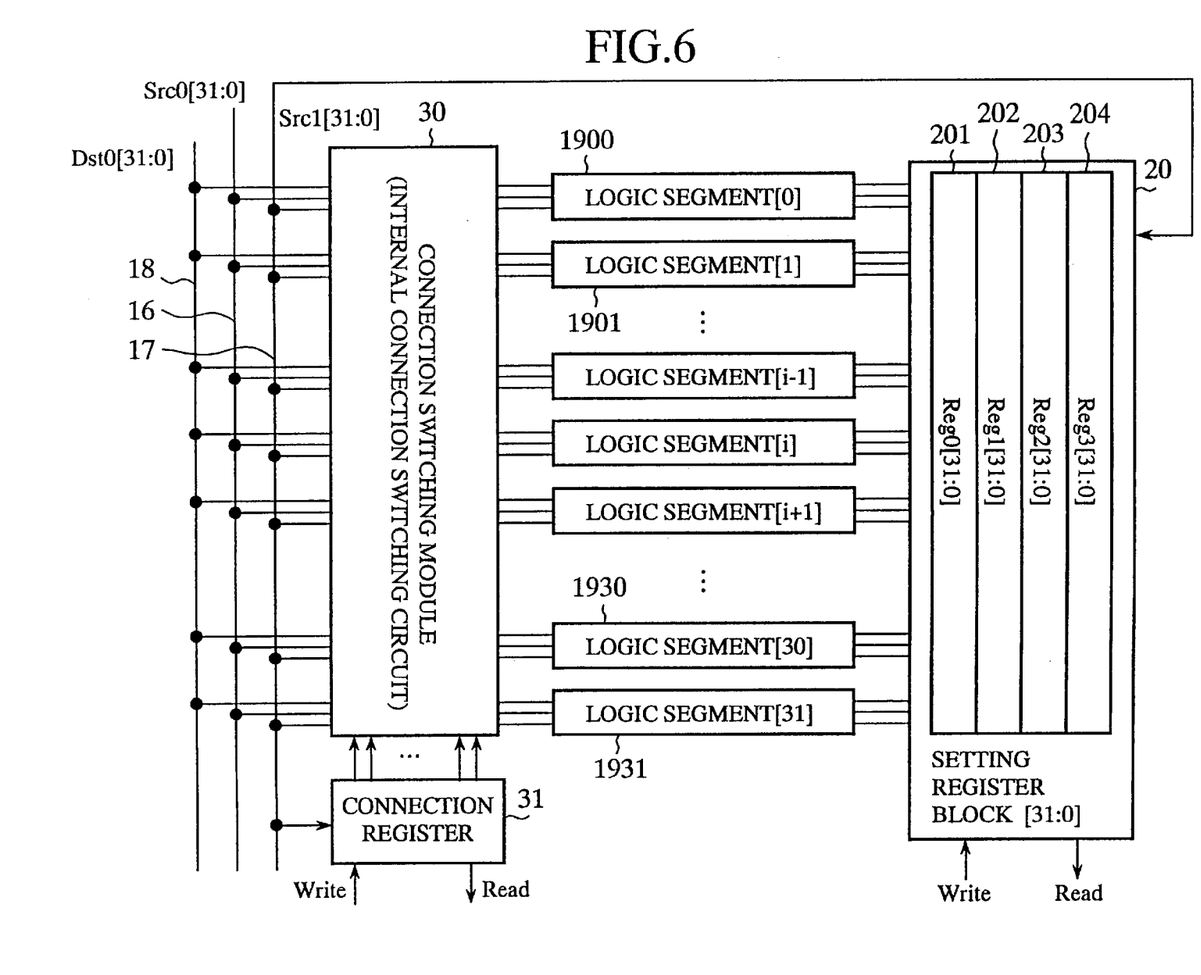
FIG. 6 is a block diagram showing a configuration of an operation unit of an embodiment 4 in accordance with the present invention.

FIG. 6 is a block diagram showing a configuration of an operation unit of an embodiment 4 in accordance with the present invention. In FIG. 6, the reference numeral 30 designates a connection switching module (internal connection switching circuit) interposed between the input data lines 16 and 17 and the logic segments 1900–1931 for switching connection of the input data bit on each of the input data lines to the logic segment 19xx, and 31 designates a connection register (internal connection switching circuit) for storing data for setting the connection state of the connection switching module 30. Since the remaining configuration of the present embodiment 4 is the same as that of the embodiment 3, the description thereof is omitted here.

Next, the operation of the present embodiment 4 will be described.

First, the controller 5 supplies the connection register 31 with a write signal and two consecutive data to be written thereinto through the external bus line 4 by sequentially switching the two data. Thus, the connection register 31 rewrites its 64-bit contents using the two 32-bit data, and produces the output. Incidentally, the contents of the connection register 31 can be read by supplying it with a read signal. In this way, the connection switching module 30 switches the destination of the two input data on the input data lines 16 and 17 on the bit by bit basis.

Before or after the above setting, the setting registers 201–204 are set in accordance with an intended operation, so that the intended operation is executed. Since the operation thereafter is the same as that of the embodiment 3, description thereof is omitted.

The present embodiment 4 comprises, in the operation unit 13, the logic circuits 24, 26 and 28, and selectors 25, 27 and 29 as shown in FIG. 5 for performing a predetermined operation, the connection switching module 30 for switching the destination of each input data bit, and the connection register 31 for setting the connection state of the connection switching module 30. This makes it possible for the operation unit 13 to achieve operations other than normal operations which handle each pair of bits in the corresponding positions of the two input data. For example, operations between bits in different positions of the two input data, such as between the first bit and the 32nd bit, can be achieved. Furthermore, operations between different bits of the same input data can also be implemented. Thus, the present embodiment 4 can achieve very complicated cryptographic processing. As a result, it has an advantage of improving the confidentiality of the cryptographic processing.

Embodiment 5

Figure 7:
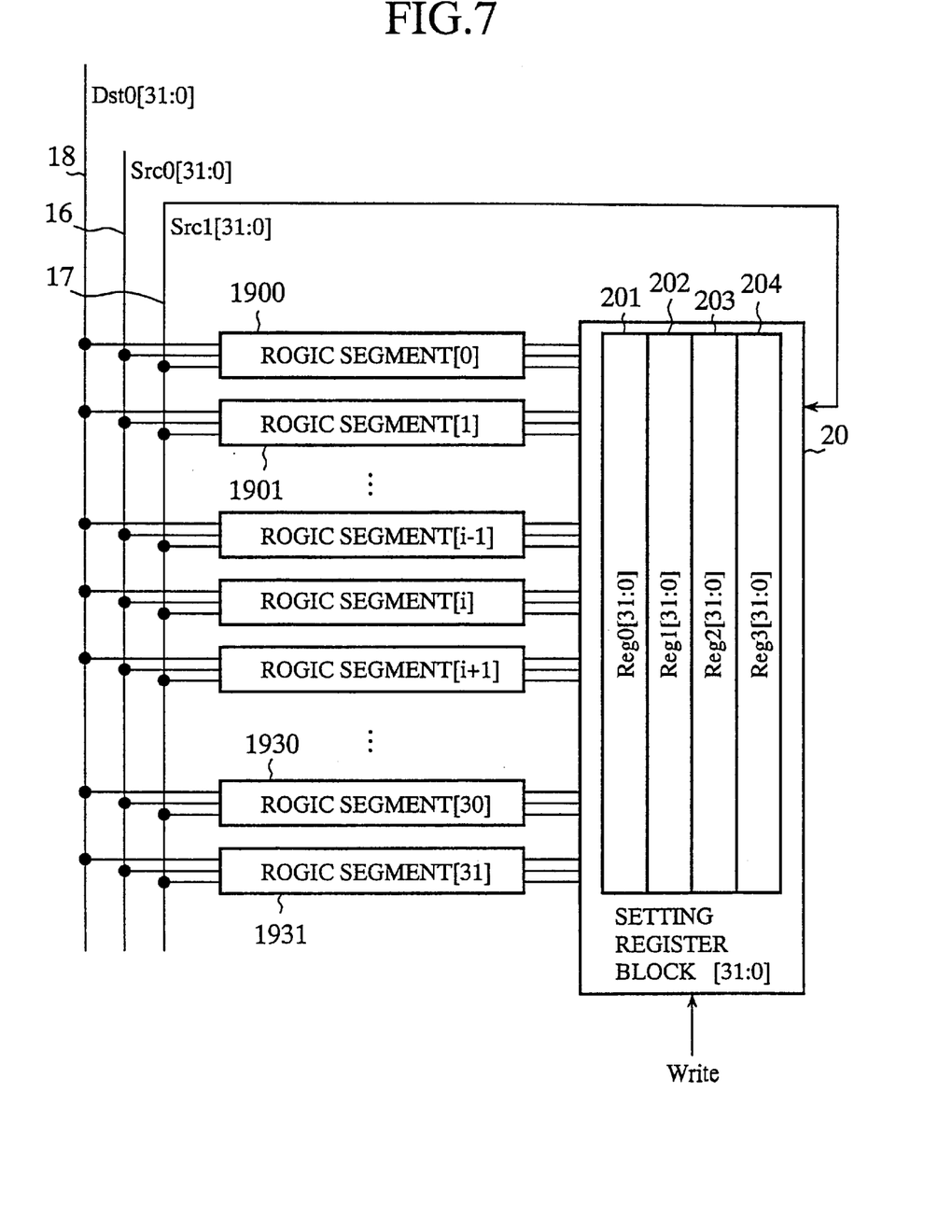
FIG. 7 is a block diagram showing a configuration of an operation unit of an embodiment 5 in accordance with the present invention.

FIG. 7 is a block diagram showing a configuration of the operation unit 13 of an embodiment 5 in accordance with the present invention. In FIG. 7, the setting register block 20 is constructed such that it can accept only the write signal. Since the remaining configuration is the same as that of the embodiment 3, description thereof is omitted by designating the like portions by the same reference numerals. In addition, the operation of the present embodiment 5 is the same as that of the embodiment 3 except that it inhibits reading of the setting register block 20, its description is also omitted.

Thus, since the present embodiment 5 is configured such that only writing of the setting registers 201–204 is allowed, it has, besides the advantage of the embodiment 3, an advantage of further improving the confidentiality of the cryptographic processing because the contents of the setting registers 201–204 cannot be read to analyze them.

Embodiment 6

Figure 8:
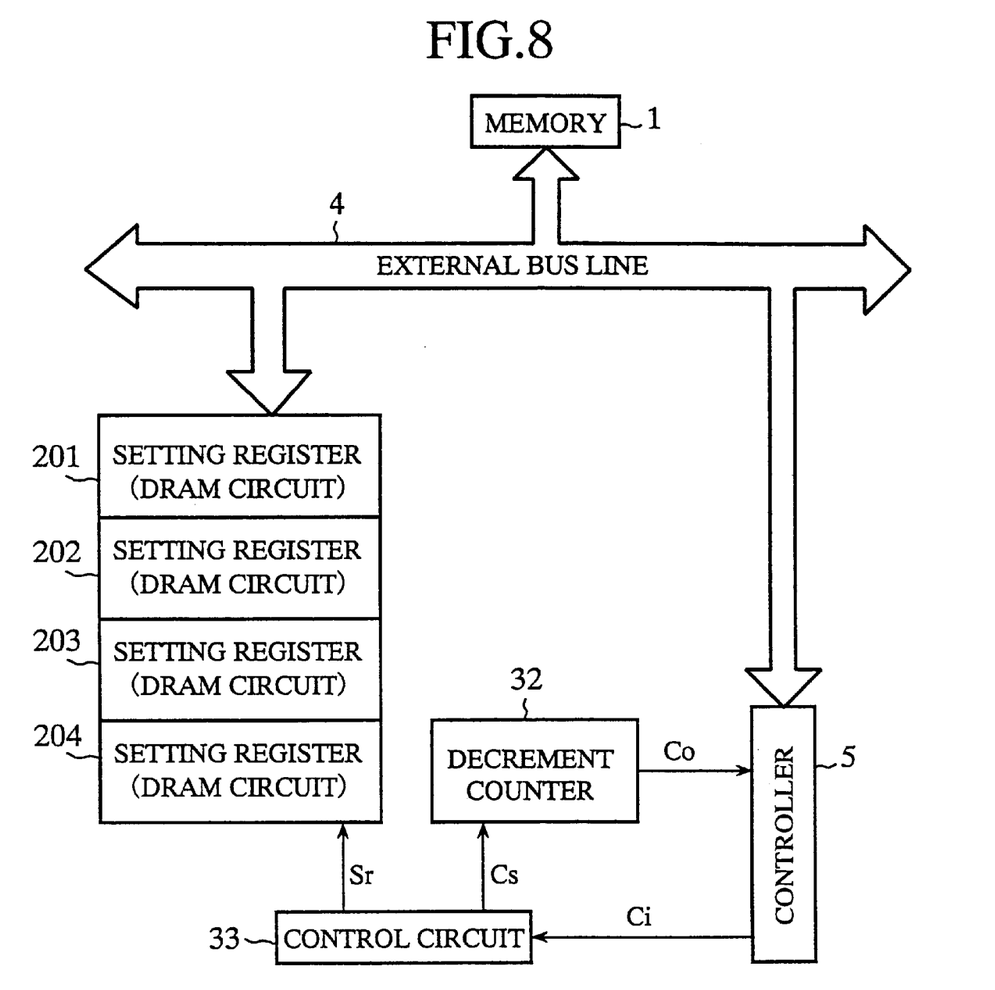
FIG. 8 is a block diagram showing a configuration of a refresh unit of an embodiment 6 in accordance with the present invention.

An embodiment 6 is characterized in that it employs, as the setting registers 201–204 as shown in FIG. 4, a dynamic memory (DRAM circuit) whose data will be lost without refresh within a predetermined interval, and comprises a refresh circuit as shown in FIG. 8. In FIG. 8, the reference numeral 32 designates a decrement counter (extended set function eliminator) for decrementing one by one from a set value at each clock interval, and for supplying a controller 5 with a count over signal Co when its count value becomes negative. The reference numeral 33 designates a control circuit (extended set function eliminator) for supplying the four setting registers 201–204 with a refresh signal Sr, and for setting to the decrement counter 32 a count value greater than the refresh cycle by a small amount, in response to a counter initial value set signal (set continue signal) Ci fed from the controller 5. Since the remaining configuration of the present embodiment 6 is the same as that of the embodiment 3, the description thereof is omitted by designating the corresponding portions by the same reference numerals.

Next, the operation of the present embodiment 6 will be described.

The controller 5, operating in accordance with a stored control program, supplies the control circuit 33 with the counter initial value set signal Ci. Thus, the control circuit 33 refreshes the setting registers 201–204 with the refresh signal Sr, and controls the decrement counter 32 in such a manner that its count value does not become negative in a normal case.

In such a state, if an interrupt occurs to the control program, its execution is prolonged. As a result, the issue of the counter initial value set signal Ci is delayed, and the count value of the decrement counter 32 becomes negative, producing the count over signal Co. Receiving the count over signal Co, the controller 5 instructs the control program to execute an exceptional processing by force.

Thus, if a wrong interrupt occurs while executing the refresh of the setting registers 201–204 by means of a software processing with the control program, the contents of the setting registers 201–204 will be eliminated owing to that interrupt.

According to the present embodiment 6, even if a trial is made to read the contents of the setting registers 201–204 by a wrong interrupt, they are eliminated before reading. Thus, it is very difficult to read the contents of the setting registers 201–204, which offers an advantage of improving the confidentiality of the cryptographic processing.

A similar effect and advantage can be expected using, instead of the decrement counter 32, a watchdog timer that increments its count value one by one at every clock cycle, and supplies the controller 5 with a count over signal when the count value reaches a set value.

In addition, the contents of the setting registers 201–204 can be eliminated using a memory other than the dynamic memory. For example, when using a static memory, it is possible for the controller 5 to delete its contents by forcibly overwriting some data on the static memory in response to the count over signal. When using a read only memory, on the other hand, the controller 5 can eliminate its contents by supplying it with an overcurrent in response to the count over signal so as to burn it off.

Embodiment 7

Figure 9:
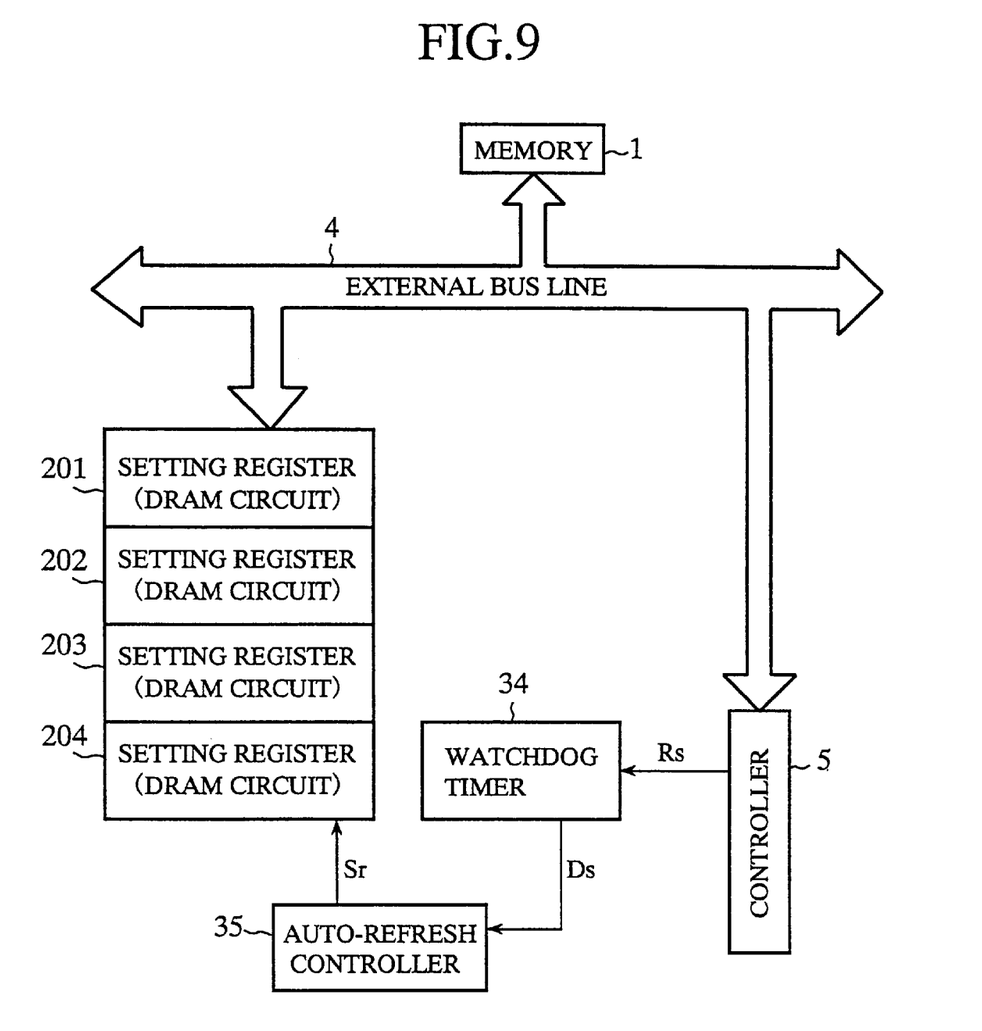
FIG. 9 is a block diagram showing a configuration of a refresh unit of an embodiment 7 in accordance with the present invention.

FIG. 9 is a block diagram showing a refresh unit of an embodiment 7 in accordance with the present invention. In FIG. 9, the reference numeral 34 designates a watchdog timer (extended set function eliminator) for decrementing one by one at each clock interval from when a reset signal Rs is supplied from the controller 5, and for outputting a disable signal Ds when its count value becomes a preset value. The reference numeral 35 designates an auto-refresh controller (extended set function eliminator) for supplying the four setting registers 201–204 with a refresh signal Sr at a predetermined interval, and for stopping outputting the refresh signal Sr when the disable signal Ds is supplied from the watchdog timer 34. Since the remaining configuration of the present embodiment 7 is the same as that of the embodiment 6, the description thereof is omitted by designating the corresponding portions by the same reference numerals.

Next, the operation of the present embodiment 7 will be described.

The controller 5, operating in accordance with a stored control program, supplies the watchdog timer 34 with the reset signal Rs. Thus, the controller 5 controls the watchdog timer 34 in such a manner that its count value does not exceed the preset value in a normal case, and the auto-refresh controller 35 refreshes the setting registers 201–204 with the refresh signal Sr.

In such a state, if an interrupt occurs to the controller 5, it handles the interrupt in response to the type of the interrupt. As a result, the controller 5 suspends the supply of the reset signal Rs to the watchdog timer 34, and hence the watchdog timer 34 outputs the disable signal Ds. Receiving the disable signal Ds, the auto-refresh controller 35 stops outputting the refresh signal Sr.

Thus, if a wrong interrupt occurs while the controller 5 executes the refresh of the setting registers 201–204 by means of a software processing, the contents of the setting registers 201–204 will be eliminated owing to that interrupt within the predetermined interval.

According to the present embodiment 7, even if a trial is made to read the contents of the setting registers 201–204 by a wrong interrupt, they are eliminated before reading. Thus, it is very difficult to read the contents of the setting registers 201–204, which offers an advantage of improving the confidentiality of the cryptographic processing.

Embodiment 8

Figure 10:
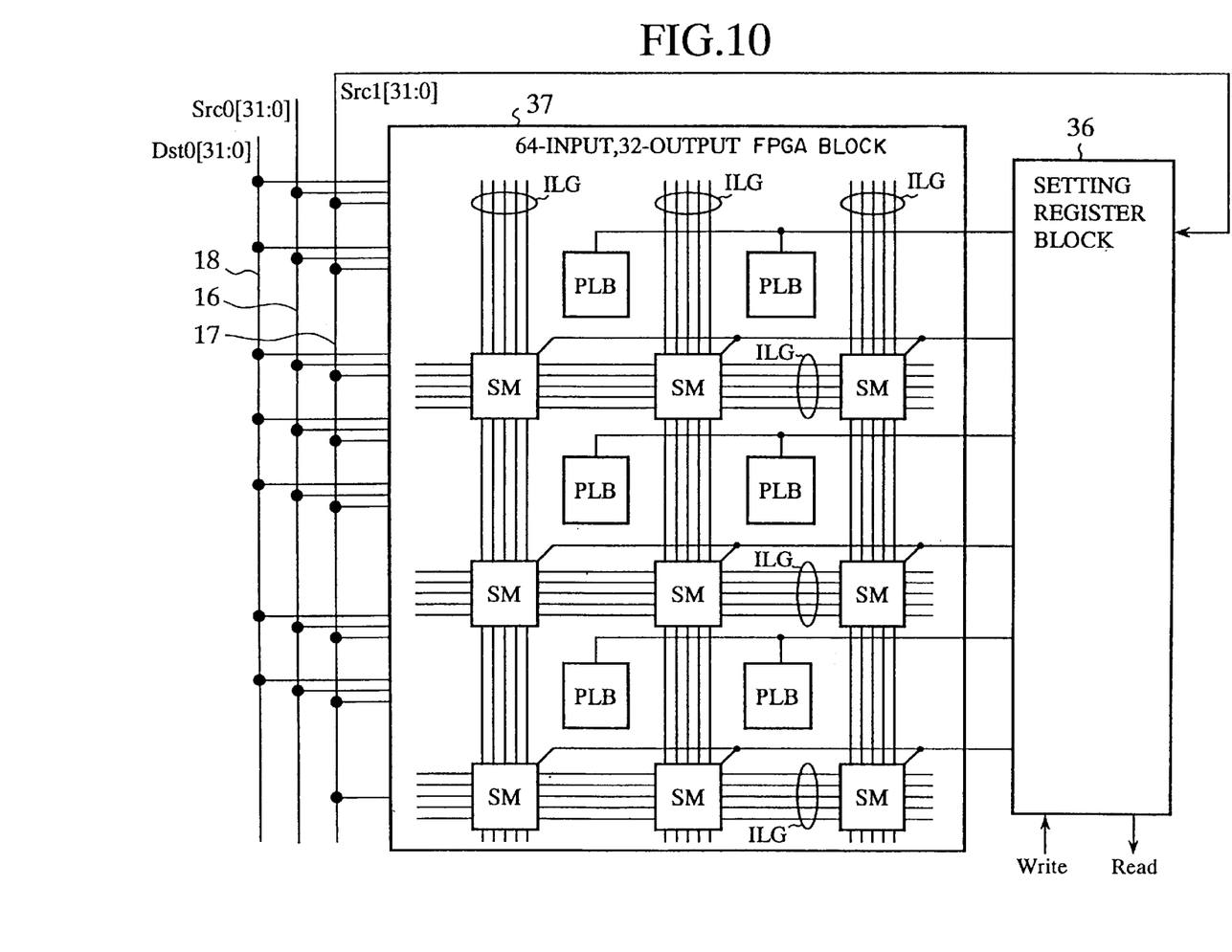
FIG. 10 is a block diagram showing a configuration of an operation unit of an embodiment 8 in accordance with the present invention.

FIG. 10 is a block diagram showing an operation unit of an embodiment 8 in accordance with the present invention. In FIG. 10, the reference numeral 37 designates a field programmable gate array (FPGA) block (logic circuit) for performing various types of operations on a 64-bit input and 32-bit output basis, and 36 designates a setting register block including setting registers (extended operational function setting register) for storing data. Since the remaining configuration is the same as that of the embodiment 3, the description thereof is omitted here by designating the corresponding portions by the same reference numerals.

The FPGA block 37 and setting register block 36 will be described further. As shown in FIG. 10, this section comprises programmable logic blocks (PLBs) for performing logic operations, switch matrices (SMs) for switching a destination programmable logic block to which the input data is supplied, and the setting registers in which a switching pattern for controlling the switch matrices is set. The section can be considered equivalent to a circuit which is disclosed in FIG. 20 of U.S. Pat. No. 5,541,529 or that shown in FIGS. 1, 2 and 4 of H. Hsieh, et al., "A second generation user-programmable gate-array", pp. 515–521, CUSTOM INTEGRATED CIRCUITS CONFERENCE, IEEE, 1987, and which is implemented in a suitable circuit scale. Furthermore, comparing with those circuits disclosed in the foregoing documents, the circuit of FIG. 10 of the present embodiment is characterized in that the FPGA block and the setting registers are arranged individually so that they are separated apart, though they are mixed in the layout in the foregoing documents. With this configuration, the present embodiment 8 can rewrite the setting registers in a short time interval, which implements fast functional change as in the embodiment 3. In addition, the present embodiment 8 can also preset the contents of the setting registers so that the operation corresponding to the set contents is carried out.

Next, the operation of the present embodiment 8 will be described.

First, the controller 5 supplies the setting register block 36 with a write signal and two consecutive data to be written thereinto through the external bus line 4 by sequentially switching two data, for example. Thus, the setting register block 36 rewrites its 64-bit contents using the two 32-bit data, and produces the corresponding output. Incidentally, the contents of the setting register block 36 can be read by supplying it with a read signal. In this way, the FPGA block 37 switches the destination of the two input data on the input data lines 16 and 17 on a bit by bit basis.

After the above setting, the operation is executed. Since the operation thereafter is the same as that of the embodiment 3, description thereof is omitted.

According to the embodiment 8, since the FPGA block 37 recognizes the 64-bit input signal on the bit by bit basis, it can handle each bit of the input signal free from its bit position, and output its result to any of the 32-bit output positions. This makes it possible for the FPGA block 37 to achieve diverse, complicated operations with a rather simple circuit configuration. For example, operations between bits at different positions of the two input data, such as between the first bit and the 32nd bit, can be achieved. Furthermore, operations between a plurality of inputs using a more number of bits can also be implemented. As a result, the present embodiment 8 has an advantage of improving the confidentiality of the cryptographic processing.

In addition, since the present embodiment 8 can change the bit number of the setting registers from that of data, which differs from the case of the embodiment 4, it can achieve the performance equivalent to that of the embodiment 4 with a smaller circuit scale.

What is claimed is:

1. A central processing unit comprising:
    an operational block including a register files to which an operational instruction can refer, said operation block performing an operation on input data including data set in said register file; and
    a controller for controlling said operation in response to the operational instructions,
    said operational block includes an operation unit for achieving a cryptographic processing, said operation unit having a facility which provides capability of changing an operation required for said cryptographic processing to another operation required for said cryptographic processing.

2. The central processing unit as claimed in claim 1, wherein said operation block comprises only said operation unit as an operational facility.

3. The central processing unit as claimed in claim 1, wherein said operation unit comprises a logic circuit for performing a plurality of operations on the input data, and an extended operational function setting register for selecting one of said plurality of operations of said logic circuit.

4. The central processing unit as claimed in claim 3, wherein said logic circuit comprises a plurality of logic segments, and changes connection of said logic segments in accordance with a setting of said extended operational function setting register.

5. The central processing unit as claimed in claim 3, wherein said extended operational function setting register is a write only register which prevents its data from being read.

6. The central processing unit as claimed in claim 1, wherein said operation unit comprises a logic circuit for performing a predetermined logic operation, and an internal connection switching circuit, interposed between a data input terminal of said operation unit and an input terminal of said logic circuit, for switching interconnection between the two input terminals.

7. The central processing unit as claimed in claim 3, further comprising an extended set function eliminating circuit for eliminating contents of said extended operational function setting register when said controller does not supply, within a predetermined interval, said extended operational function setting register with a set continue signal that instructs continuation of said contents.

8. The central processing unit as claimed in claim 2, wherein said operation unit comprises a logic circuit for performing a plurality of operations on the input data, and an extended operational function setting register for selecting one of said plurality of operations of said logic circuit.

9. The central processing unit as claimed in claim 8, wherein said logic circuit comprises a plurality of logic segments, and changes connection of said logic segments in accordance with a setting of said extended operational function setting register.

10. The central processing unit as claimed in claim 8, wherein said extended operational function setting register is a write only register which prevents its data from being read.

11. The central processing unit as claimed in claim 2, wherein said operation unit comprises a logic circuit for performing a predetermined logic operation, and an internal connection switching circuit, interposed between a data input terminal of said operation unit and an input terminal of said logic circuit, for switching interconnection between the two input terminals.

12. The central processing unit as claimed in claim 8, further comprising an extended set function eliminating circuit for eliminating contents of said extended operational function setting register when said controller does not supply, within a predetermined interval, said extended operational function setting register with a set continue signal that instructs continuation of said contents.

13. A central processing unit comprising:

an operation block including a register file to which an operational instruction can refer, said operation block performing an operation on data set in said register file; and a controller for controlling said operation unit to perform the operation in response to the operation instruction, wherein said operation block further includes:

first, second and third data lines, each connected to said register file;

an operation unit connected to said first to third data lines and capable of performing a plurality of operations using data transferred on at least one of said first and second data lines, respective results of said plurality of operations being output to said third data line; and a store circuit connected to said first data line and storing information specifying one of said plurality of operations transferred on said first data line, said operation unit selecting and performing the specified operation in response to the information in said store circuit.

14. The central processing unit as claimed in claim 13, wherein each of said first and second data lines has a total of n bit lines, said operation unit including a plurality of logic segments connected to the respective bit lines of said first data line and to the respective bit lines of said second data line, each logic segment capable of performing a plurality of bit operations, wherein said information includes a plurality of signals to be applied to the plurality of logic segments, respectively, each logic segment selecting and performing one of said plurality of operations in response to the applied signal, wherein said plurality of signals are capable of being stored in said store circuit so that at least two of said plurality of logic segments perform different kinds of operations.

15. The central processing unit as claimed in claim 14, wherein said store circuit includes a total of m registers connected to said first data line in common, each register storing data having an n-bit width, each of said plurality of signals is expressed by m bits which are respective bits of said m registers.

16. The central processing unit as claimed in claim 14, wherein said operation unit further includes a connection switch circuit connected to said first and second bus lines and said plurality of logic segments, for switching between connections of the n bit lines of said first bus line with said plurality of logic segments, and switching between connections of the n bit lines of said second data line with said plurality of logic segments.

17. The central processing unit as claimed in claim 13, further comprising:

an eliminating circuit for eliminating the information stored in said store circuit when said controller does not supply said eliminating circuit with a set continue signal within a predetermined interval.

18. The central processing unit as claimed in claim 17, wherein said store circuit includes a dynamic random access memory circuit storing the information, said eliminating circuit outputting a refresh signal for controlling a refresh of said dynamic random access memory circuit in response to the set continue signal and stopping outputting the refresh signal when said controller does not supply said eliminating circuit with the set continue signal within a predetermined interval.

19. The central processing unit as claimed in claim 13, wherein said operation block is a field programmable gate array including programmable logic blocks for performing logic operations and switch matrices for switching between connections between said programmable logic blocks in response to the information stored in said store circuit.

* * * * *